L. THALLMAYER.
FLY WHEEL COMPENSATING SYSTEM.
APPLICATION FILED MAY 13, 1912.
1,051,782.
Patented Jan. 28, 1913.
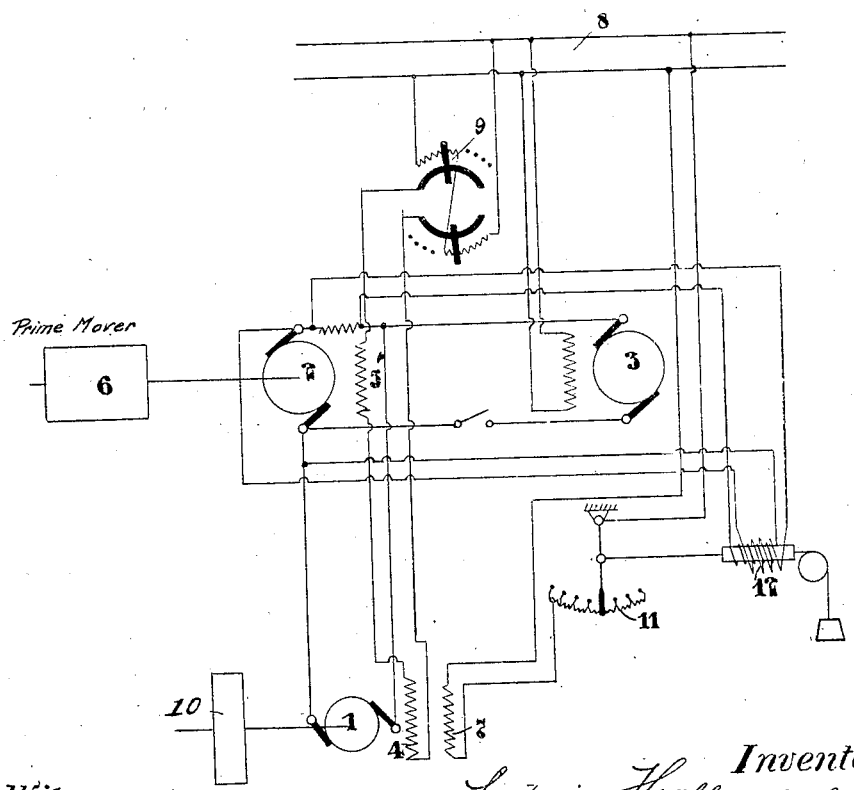

UNITED STATES PATENT OFFICE.

LUDWIG THALLMAYER, OF ZÜRICH, SWITZERLAND, ASSIGNOR TO AKTIENGESELLSCHAFT BROWN BOVERI & CIE., OF BADEN, SWITZERLAND.

FLY-WHEEL COMPENSATING SYSTEM.

1,051,782.  Specification of Letters Patent.  Patented Jan. 28, 1913.

Application filed May 13, 1912. Serial No. 696,952.

*To all whom it may concern:*

Be it known that I, LUDWIG THALLMAYER, a subject of the Emperor of Austria-Hungary, and residing at Zürich, Switzerland, have invented certain new and useful Improvements in Fly-Wheel Compensating Systems, of which the following is a specification.

This invention relates to the regulation of dynamo electric machinery and more particularly to the regulation of dynamos feeding motors for the working of hauling plants and the like.

This invention consists in exciting the regulating machine in such a manner that its terminal voltage varies in the same way as the starting machine which is connected in parallel with it.

Referring to the accompanying diagrammatic drawing, the figure shows an arrangement embodying one form of the present invention.

The motor 3 when driving a hauling plant for instance, is electrically connected to a starting generator 2, driven by a suitable prime mover 6 and to a regulating motor generator 1 provided with a field winding 4 and connected to a fly wheel 10. The field winding 5 of the starting machine 2 is connected to the mains 8 through a variable resistance 9. An additional exciting winding 7 is provided for the machine 1 having in series therewith a resistance 11 automatically variable by the double wound solenoid 12, one winding of which receives current depending on the terminal voltage of the dynamo 2 and the other current depending on the current flowing in the mains connecting the generator 2 with the motor 3.

In the form of the invention illustrated the machine 1 acts either as a motor receiving energy from the dynamo 2 and storing it in the fly wheel 10, or absorbs energy from this fly wheel and acts as a generator assisting the dynamo 2 for driving the motor 3. The excitation of the regulating machine 1 is varied so that its terminal voltage changes as that of the starting machine 2 connected in parallel with it also changes. In addition to this variation in voltage the field of the regulating machine must be further influenced depending upon the load on the starting machine, in such a way that the voltage of this regulating machine during the period allowed for the absorption of energy by the fly wheel is smaller than the voltage of the starting machine by an amount corresponding to that required for loading the driving motor of the starting machine to its maximum extent as when the same is loaded by the drive of the regulating machine and the motor 3. Vice versa the field of the regulating machine during the period during which the energy required by the motor 3 cannot be supplied by the starting machine alone on account of the load on the driving motor of the starting machine, must be so regulated that in parallel with the starter it supplies current into the consuming motor 3.

The system described allows of using any suitable driving motor for the starting machine, the restriction of its maximum load insuring a maximum economy of the same. Further we obtain the advantage that the starting machine can be dimensioned for constant load and not for the whole load on the driven motor, the starting machine being merely divided into two parts of which the second at the most is to yield only the difference in power between the motors to be controlled and the starting machine. The additional expenses caused by the separate regulating machine are consequently completely balanced by the cheapening of the starting machine. Apart from this it is possible to allow the starting machine to work at any suitable speed which, for instance, is desirable with a turbine drive in which case in consequence of their practically constant power yield commutation difficulties are avoided. Further, this kind of regulation permits of suitable utilization of the fly wheel masses, as the regulation of the speed of the same can be effected without losses in energy. Also it is possible to couple to the starting machine any suitable current generators, without it being necessary to have to take into account fluctuating voltages. The voltage of the starting machine which remains unchanged during the working period of course also permits of a more efficient utilization of this machine and of a constant speed of the driving motor.

Having now described my invention what I claim as new and desire to secure by Letters Patent is:—

1. In dynamo electric machinery, in combination, a generator and a motor electrically connected one to the other, a dynamo electric machine connected to the generator in shunt with the motor and a mechanical energy storing device mechanically connected to said dynamo electric machine, the generator and dynamo machines each having a field winding, said windings being connected to an external source of energy and provided with controlling means common to both machines, substantially as described.

2. In dynamo electric machinery, in combination, a generator and a motor electrically connected one to the other, a dynamo electric machine connected to the generator in shunt with the motor and a mechanical energy storing device mechanically connected to said dynamo electric machine, the generator and dynamo machines each having a field winding, said windings being connected to an external source of energy and provided with controlling means common to both machines, the dynamo electric machine having a second field winding connected to the external source of energy and a controlling means therefor provided with two windings, one being connected to the generator to receive current dependent on the terminal voltage thereof and the other connected between the generator and motor and dependent on current flowing between them, substantially as described.

3. In dynamo electric machinery, in combination, a generator and a motor, electrical connections from said generator to said motor, a prime mover and a mechanical connection from said prime mover to said generator, an exciting winding for said generator and an electrical controller connected to said winding, a dynamo electric machine connected in shunt with said generator and said motor, a mechanical energy storing device and a mechanical connection from said dynamo electric machine to said storing device, a further electrical controller and electrical means comprising differential windings for operating same, said dynamo electric machine having exciting windings, one of which is electrically connected to one controller and the other of which is electrically connected to the other controller, substantially as described.

In testimony whereof, I affix my signature in presence of two witnesses.

LUDWIG THALLMAYER.

Witnesses:
 CARL GUBLER,
 CHAS. H. SELBY.